Dec. 4, 1934.　　　　W. FLETCHER　　　　1,982,650
OPTICAL DEVICE
Filed Feb. 14, 1934
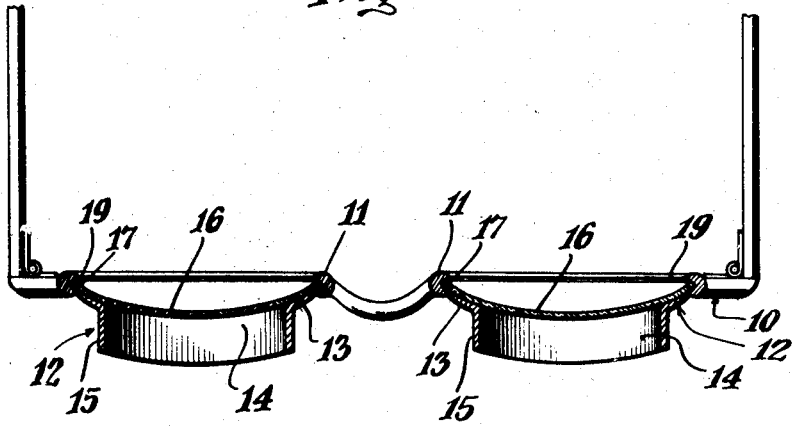
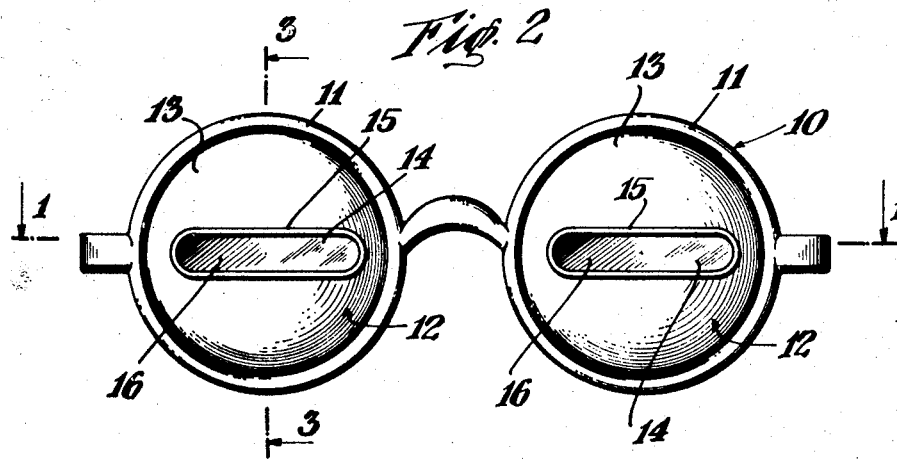
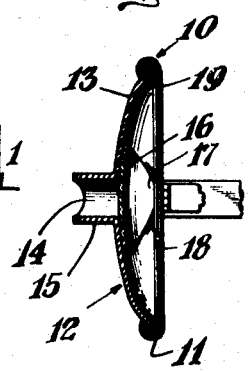
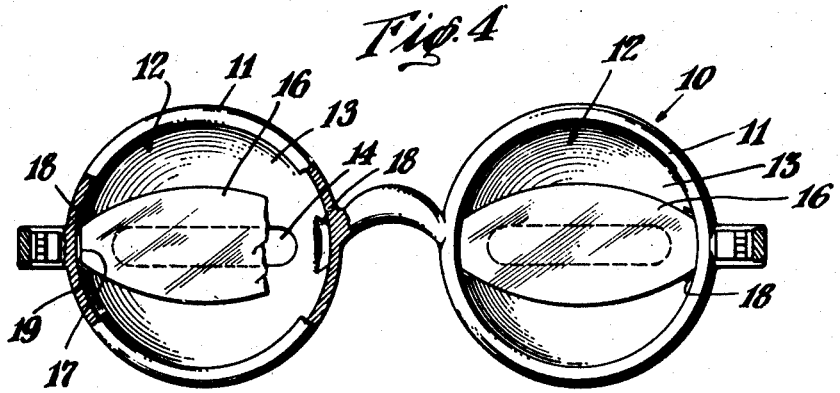
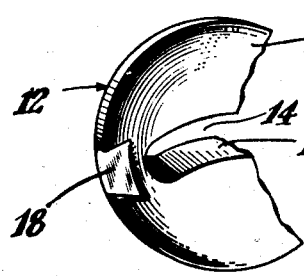
INVENTOR
William Fletcher
BY
Watson, Bristol, Johnson & Leavenworth
ATTORNEYS Patented Dec. 4, 1934

1,982,650

UNITED STATES PATENT OFFICE 1,982,650

OPTICAL DEVICE

William Fletcher, London, England, assignor to Centa Trading Corporation, New York, N. Y., a corporation of New York Application February 14, 1934, Serial No. 711,148

3 Claims. (Cl. 2—14)

The present invention relates to optical devices for shielding the eyes from excessive light and is preferably embodied in the form of spectacles.

A general object of the invention is the provision of such a device which efficiently increases the sight capacity of the human eye in cases where objects to be focused are surrounded by other objects which are highly illuminated, and is an improvement upon the device disclosed in the copending application of Peter Schlumbohm, Serial No. 634,744, filed September 24, 1932, issued April 10, 1934, as United States Letters Patent Number 1,954,184.

A more specific object of the invention is the provision of such a device comprising a spectacle frame including a pair of diaphragm supporting rims in each of which is mounted a diaphragm consisting of an opaque plate provided with a horizontal slot disposed on the level of the center of rotation of the eye and with a forwardly projecting tube in registry with the slot, the height of the slot and corresponding diameter of the inside of the tube being larger than the normal diameter of the pupil of the eye, the lateral length of the slot and corresponding diameter of the inside of the tube being sufficient to give lateral vision, the forward length of the tube being sufficient to augment the subjective intensity of a viewed object by creating a field stop, with which is associated a sheet of transparent material sprung into position behind the diaphragm and held by the rim to cover the slot and prevent intrusion of dust particles, insects and the like.

Other objects of the invention will in part be obvious and will in part appear hereinafter.

The invention accordingly comprises an article of manufacture possessing the features, properties, and the relation of elements which will be exemplified in the article hereinafter described, and the scope of the invention of which will be indicated in the claims.

For a fuller understanding of the nature and objects of the invention reference should be had to the following detailed description taken in connection with the accompanying drawing, in which:

Fig. 1 is a sectional view taken on line 1—1 of Fig. 2 depicting the device of the present invention;

Fig. 2 is a front elevational view of the device shown in Fig. 1;

Fig. 3 is a sectional view on line 3—3 of Fig. 2;

Fig. 4 is a rear elevational view with parts broken away of the device depicted in Figs. 1, 2 and 3; and Fig. 5 is a perspective view of a portion of the diaphragm plate used with the device shown in Figs. 1, 2, 3 and 4.

The objective light-value depends upon the intensity of the source of the primary light and, of course, can be augmented only by using a stronger source of primary light. The subjective light-value, however, can be increased without using a stronger source of primary light since it depends upon the circumstances under which the object is viewed. Light coming from objects surrounding the objects to be focused reduces the sensibility of the human eye with regard to the rays coming from the object to be focused.

The device of the present invention allows the human eye fully to receive all of the light which comes from the objects to be focused while the light coming from the surrounding objects is wholly screened off without reducing the quantity of light directed into the human eye from the objects to be focused.

This is accomplished by providing the rims of a pair of spectacles with diaphragms, each of which includes an opaque plate having a horizontal slot disposed on the level of the center of rotation of the eye, having a vertical diameter larger than the normal diameter of the pupil of the eye, that is, a vertical diameter between about 5 and 10 millimeters, the diameter of a normal pupil of an eye in light of medium intensity being about 4 millimeters. The lateral length of the slot is sufficient to give lateral vision. A forwardly projecting tube is provided on the diaphragm plate in registry with the slot, the forward length of the tube being sufficient to augment the subjective intensity of a viewed object by creating a field stop, preferably of a length about equal to the vertical diameter of the slot. The intrusion of dust particles, insects and the like through the slot is prevented by a strip of transparent material mounted on the rear of the diaphragm to cover the slot and having the ends thereof supported by the rim, notches preferably being formed in the edge of the diaphragm so that the ends of the strip may be engaged in portions of the rim groove left free by the notches.

Referring to the drawing, like numerals refer to like parts throughout. A spectacle frame 10 of convenient form having a pair of rims 11—11 is provided with a pair of diaphragms 12—12, preferably arcuate shaped in section. Each diaphragm 12 consists of an arcuate shaped opaque plate 13, preferably molded from any suitable material such as "bakelite", in which is formed a slot 14 surrounded by a forwardly projecting tube 15, and a sheet or strip 16 of transparent material covering the slot 14. The height of the slot 14 and the corresponding diameter of the inside of the tube 15 are larger than the normal diameter of the eye, that is, from about 5 to 10 millimeters. The lateral length of the slot 14 and the corresponding diameter of the inside of the tube 15 are sufficient to give lateral vision. The forward length of the tube 15 is sufficient to augment the subjective intensity of a viewed object by creating a field stop, for example, from about 5 to 10 millimeters. Notches 18—18 are formed in the edges of the opaque plate 13 opposite the ends of the slot 14 as shown in Figs. 4 and 5. These notches leave portions of the rim groove 19 free so that when the plate 13 is mounted in the rim the ends 17—17 of the transparent strip 16 may be seated in the free portions of the groove 19. The strip 16 is then sprung into position to cover the slot 14 as depicted in Figs. 1, 3 and 4.

It will thus be seen that the device of the present invention efficiently attains the objects set forth above. This device can be used to great advantage by audiences of sporting events, theatrical and motion picture performances, etc. By using the described device the wearer is no longer disturbed by side-light effects coming from the sky, the sun, or highly illuminated backgrounds, the side-lights being efficiently screened off. The full sensibility of the eye is thus reserved for the light coming from the objects to be focused, and owing to these improved psychological conditions the sight capacity of the eye is considerably increased. The particular structure shown and described provides a simple means for excluding the intrusion of particles of dust, insects and the like, while allowing ready assembly thereof.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. An eye shield comprising a spectacle frame including a pair of diaphragm supporting rims and a pair of diaphragms supported in said rims, each diaphragm consisting of an opaque plate arcuate shaped in section provided with a horizontal slot disposed on the level of the center of rotation of the eye and with a forwardly projecting tube in registry with said slot, and a sheet of transparent material sprung into position between each of said opaque plates and its rim to have face engagement with the rear of said plate and cover said slot, the height of the slot and the corresponding diameter of the inside of the tube being larger than the normal diameter of the pupil of the eye and the lateral length of the slot and corresponding diameter of the inside of the tube being sufficient to give lateral vision, the forward length of the tube being sufficient to augment the subjective intensity of a viewed object by creating a field stop.

2. An eye shield comprising a pair of rims, a plate of opaque material arcuate shaped in section mounted in each of said rims, said plate being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision, the forward length of the tube being sufficient to augment the subjective intensity of a viewed object by creating a field stop, and a strip of transparent material sprung into position between each of said rims and said plates to have face engagement with the rear of said plate and to cover the slot therein.

3. An eye shield comprising a pair of grooved rims, a plate of opaque material arcuate shaped in section mounted in the groove in each of said rims, said plate being provided with a horizontal slot disposed on the level of the center of rotation of the eye, with a forwardly projecting tube in registry with said slot, and with a pair of diametrically opposed notches formed in the edge thereof substantially in line with said slot, the height of the slot and the corresponding diameter of the inside of the tube being larger than the normal diameter of the pupil of the eye and the lateral length of the slot and corresponding diameter of the inside of the tube being sufficient to give lateral vision, the forward length of the tube being sufficient to augment the subjective intensity of a viewed object by creating a field stop, and a strip of transparent material covering substantially only the slot sprung into position to have face engagement with the rear of said plate and to cover the slot therein with the ends of said strip engaged in the portions of the rim groove left free by the notches in the edge of said plate.

WILLIAM FLETCHER.